(12) United States Patent
Bessios et al.

(10) Patent No.: US 7,620,116 B2
(45) Date of Patent: Nov. 17, 2009

(54) TECHNIQUE FOR DETERMINING AN OPTIMAL TRANSITION-LIMITING CODE FOR USE IN A MULTI-LEVEL SIGNALING SYSTEM

(75) Inventors: Anthony Bessios, Fremont, CA (US); Jared Zerbe, Woodside, CA (US)

(73) Assignee: Rambus Inc., Los Altos, CA (US)

( * ) Notice: Subject to any disclaimer, the term of this patent is extended or adjusted under 35 U.S.C. 154(b) by 1121 days.

(21) Appl. No.: 10/667,492

(22) Filed: Sep. 23, 2003

(65) Prior Publication Data

US 2004/0170231 A1    Sep. 2, 2004

Related U.S. Application Data

(60) Provisional application No. 60/450,349, filed on Feb. 28, 2003, provisional application No. 60/494,561, filed on Aug. 13, 2003.

(51) Int. Cl.
  *H04L 25/49* (2006.01)
(52) U.S. Cl. .............. 375/286; 375/242; 375/259; 341/58; 341/59; 341/95
(58) Field of Classification Search ............. 375/286, 375/242, 259; 341/58, 59, 95
  See application file for complete search history.

(56) References Cited

U.S. PATENT DOCUMENTS

| | | | |
|---|---|---|---|
| 5,640,163 A | 6/1997 | Nauta et al. | |
| 5,812,079 A | 9/1998 | Ito et al. | |
| 5,859,601 A | 1/1999 | Moon et al. | |
| 6,031,472 A | 2/2000 | Johnson et al. | |
| 6,211,803 B1 | 4/2001 | Sunter | |
| 6,526,530 B1 | 2/2003 | Nazari et al. | |
| 6,538,584 B2 | 3/2003 | Kennedy et al. | |
| 6,696,988 B2 | 2/2004 | Chen | |
| 6,731,692 B1 | 5/2004 | Bhoja | |
| 6,819,137 B1 | 11/2004 | Wang et al. | |
| 6,917,312 B2 | 7/2005 | Bessios | |
| 7,113,550 B2 | 9/2006 | Stonecypher et al. | |

(Continued)

FOREIGN PATENT DOCUMENTS

WO    WO 98/44633    10/1998
WO    WO 2004/053810    6/2004

OTHER PUBLICATIONS

A. X. Widmer et al., "A DC-Balanced, Partitioned-Block, 8B/10B Transmission Code," pp. 440-451, IBM J. Res. Dev., vol. 27-5, 1983.

(Continued)

*Primary Examiner*—Mohammad H Ghayour
*Assistant Examiner*—Leila Malek
(74) *Attorney, Agent, or Firm*—Hunton & Williams LLP

(57) ABSTRACT

A technique for determining an optimal transition-limiting code for use in a multi-level signaling system is disclosed. In one particular exemplary embodiment, the technique may be realized as a method for determining an optimal transition-limiting code for use in a multi-level signaling system. Such a method comprises determining a coding gain for each of a plurality of transition-limiting codes, and selecting one of the plurality of transition-limiting codes having a largest coding gain for use in the multi-level signaling system.

11 Claims, 16 Drawing Sheets

U.S. PATENT DOCUMENTS

| | | |
|---|---|---|
| 7,180,957 B2 | 2/2007 | Bessios |
| 7,180,958 B2 | 2/2007 | Bessios et al. |
| 7,180,959 B2 | 2/2007 | Bessios et al. |
| 7,302,631 B2 | 11/2007 | Bansal |
| 2003/0108134 A1 | 6/2003 | Stonick et al. |
| 2003/0152154 A1 | 8/2003 | Johnson |
| 2004/0037421 A1* | 2/2004 | Truman .................. 380/200 |
| 2004/0109509 A1 | 6/2004 | Stonecypher et al. |
| 2004/0109510 A1 | 6/2004 | Bessios et al. |
| 2004/0170231 A1 | 9/2004 | Bessios et al. |
| 2004/0208257 A1 | 10/2004 | Bessios et al. |
| 2004/0240580 A1 | 12/2004 | Bessios et al. |
| 2005/0099325 A1 | 5/2005 | Bessios |
| 2006/0126751 A1 | 6/2006 | Bessios |

OTHER PUBLICATIONS

Ramin Farjad-RD et al., "A 0.3-μm CMOS 8-Gb/s 4-PAM Serial Link Transceiver," IEEE Journal of Solid-State Circuits, vol. 35, No. 5, May 2000, pp. 757-764.

David D. Falconer et al., "Bounds on Error-Pattern Probabilities for Digital Communications Systems," IEEE Transactions On Communications, vol. COM-20, No. 2, Apr. 1972, pp. 132-139.

Burton R. Saltxberg, "Intersymbol Interference Error Bounds with Application to Ideal Bandlimited Signaling," IEEE Transactions on Information Theory, vol. IT-14, No. 4, Jul. 1968, pp. 563-568.

Kees A. Schouhamer Immink, "Runlength-Limited Sequences," Proceedings Of The IEEE, vol. 78, No. 11, Nov. 1990, pp. 1745-1759.

A. Bessios et al., Transition-limiting codes for 4-PAM signaling in high speed serial links, Global Telecommunications Conference, 2003, GLOBECOM '03, IEEE, vol. 7, pp. 3747-3751, Dec. 1-5, 2003.

V. Stojanovic, Channel-Limited High Speed Links: Modeling, Analysis and Design, PhD Dissertation, Stanford University, Sep. 2004.

* cited by examiner

|  | $I_r$ (Gb/s) | | | | | |
|---|---|---|---|---|---|---|
|  | 5 | | 6.25 | | 7.8 | |
|  | ch-1 | ch-2 | ch-1 | ch-2 | ch-1 | ch-2 |
| M.I.S. $\alpha=0.01$ | 14,5,5 | 21,7,7 | 22,5,5 | 22,9,9 | 22,9,9 | 22,12,12 |
| $SIR_U$, $SIR_C$ eqn.(13) | 21.7,- | 20,- | 22.5,24.8 | 17.5,20.5 | 17.1,19.4 | 18.7,21.5 |

Figure 10

TECHNIQUE FOR DETERMINING AN OPTIMAL TRANSITION-LIMITING CODE FOR USE IN A MULTI-LEVEL SIGNALING SYSTEM

CROSS-REFERENCE TO RELATED APPLICATIONS

This patent application claims priority to U.S. Provisional Patent Application No. 60/450349, filed Feb. 28, 2003, which is hereby incorporated by reference herein in its entirety.

This patent application also claims priority to U.S. Provisional Patent Application Ser. No. 60/494,561, filed Aug. 13, 2003, which is hereby incorporated by reference herein in its entirety.

FIELD OF THE INVENTION

The present invention relates generally to multi-level signaling and, more particularly, to a technique for determining an optimal transition-limiting code for use in a multi-level signaling system.

BACKGROUND OF THE INVENTION

High-speed serial link channels delivering an effective data rate above 5 Gb/s in a backplane environment are subject to significant signal distortion due to inter-symbol interference (ISI). Transmitters and receivers need to compensate for most of the signal distortion using very low complexity schemes in order to obtain a target bit error rate (BER) of less than or equal to $10^{-17}$ at Gb/s rates and under severe power and complexity restrictions. This constrained space presents significant challenges to well-known signal processing and coding techniques, and sub-optimal but efficient alternatives are sometimes needed to fulfill the task.

Attenuation caused by conductor and dielectric losses causes dispersion ISI. Another important ISI component is reflections, which are essentially multipath components of a signal and originate from impedance discontinuities such as those caused by connectors of line cards at both transmit and receive ends. In addition to ISI distortion, cross-talk effects from far and near end adjacent channels is becoming increasingly significant.

To counteract channel attenuation at high bit rates, conventional 2-level pulse amplitude modulation (2-PAM) signaling may be replaced by other multi-level signaling schemes that utilize more than two signal levels. That is, in a 2-PAM signaling system, each conductor in the system may carry signals at one of two signal levels (i.e., at either a logic zero level or a logic one level). Thus, in a 2-PAM signaling system, each conductor in the system can only transmit one bit of data at a time. However, in a 4-level pulse amplitude modulation (4-PAM) signaling system, for example, each conductor in the system may carry signals at four different signal levels (i.e., four different symbols). Thus, in a 4-PAM signaling system, each conductor in the system can transmit two bits of data simultaneously at one half the symbol rate for an equivalent bandwidth.

While advantageous in channels with dominant attenuation, signaling systems that utilize more than two signal levels are more sensitive to reflections and cross-talk than 2-PAM signaling systems due to the reduction in signal margin as a result of carrying more information per symbol. Thus, in cases where high loss and reflections are combined, the advantages of signaling systems that utilize more than two signal levels over 2-PAM signaling systems may be lost.

In order to preserve the advantages of signaling systems that utilize more than two signal levels over 2-PAM signaling systems, transition-limiting codes have been developed which reduce or eliminate the number of full-swing transitions (FST) between sequential symbols in a multi-level signaling system. Reducing or eliminating the number of FST between sequential symbols enhances system performance in terms of: 1.) voltage margins (Vm), by reducing peak distortion (PD) via the elimination of one or more worst case sequences; and 2.) timing margins (Tm), especially at outer eyes where FST close eyes the most.

These same transition-limiting codes have also been developed to secure a minimum density of desirable symbol transitions useful for clock recovery. These clock data recovery (CDR) transitions prevent continuous phase drifting from an optimum sampling point at the center of an eye in plesiochronous systems with frequency offsets between received data and a local receive clock.

A problem sometimes arises when determining which of these transition-limiting codes may be best suited for use in a particular multi-level signaling system. Accordingly, it would be desirable to provide a technique for determining an optimal transition-limiting code for use in a multi-level signaling system.

SUMMARY OF THE INVENTION

According to the present invention, a technique for determining an optimal transition-limiting code for use in a multi-level signaling system is provided. In one particular exemplary embodiment, the technique may be realized as a method for determining an optimal transition-limiting code for use in a multi-level signaling system. Such a method comprises determining a coding gain for each of a plurality of transition-limiting codes, and selecting one of the plurality of transition-limiting codes having a largest coding gain for use in the multi-level signaling system.

In accordance with other aspects of this particular exemplary embodiment of the present invention, the plurality of transition-limiting codes may beneficially reduce or eliminate full-swing transitions between signal levels in the multi-level signaling system. If such is the case, at least some of the plurality of transition-limiting codes may beneficially have different degrees of reduction or elimination of full-swing transitions between signal levels in the multi-level signaling system. Determining the coding gain for each of the plurality of transition-limiting codes may then beneficially comprise selecting a first transition-limiting code having a first degree of reduction or elimination of full-swing transitions, determining the coding gain of a data transmission over a channel operating at a predetermined data rate in the multi-level signaling system utilizing the first transition-limiting code based at least in part upon the first degree of reduction or elimination of full-swing transitions, and then repeating these steps utilizing a second transition-limiting code having a second degree of reduction or elimination of full-swing transitions. Alternatively, determining the coding gain for each of the plurality of transition-limiting codes may then beneficially comprise characterizing a first pulse response for a channel operating at a predetermined data rate in the multi-level signaling system utilizing a first transition-limiting code having a first degree of reduction or elimination of full-swing transitions, determining the coding gain of a data transmission over the channel using the first transition-limiting code based at least in part upon the first degree of reduction or elimination of full-swing transitions, and then repeating these steps utilizing a second transition-limiting code having a second degree of reduction or elimination of full-swing transitions.

In accordance with further aspects of this particular exemplary embodiment of the present invention, at least some of the plurality of transition-limiting codes may beneficially have different sampling rates. If such is the case, determining the coding gain for each of the plurality of transition-limiting codes may beneficially comprise selecting a first transition-limiting code having a first sampling rate, determining the coding gain of a data transmission over a channel operating at a predetermined data rate in the multi-level signaling system utilizing the first transition-limiting code based at least in part upon the first sampling rate, and then repeating these steps utilizing a second transition-limiting code having a second sampling rate. Alternatively, determining the coding gain for each of the plurality of transition-limiting codes may beneficially comprise characterizing a first pulse response for a channel operating at a predetermined data rate in the multi-level signaling system utilizing a first transition-limiting code having a first sampling rate, determining the coding gain of a data transmission over the channel using the first transition-limiting code based at least in part upon the first pulse response, and then repeating these steps utilizing a second transition-limiting code having a second sampling rate.

In accordance with additional aspects of this particular exemplary embodiment of the present invention, the coding gain for each of the plurality of transition-limiting codes may beneficially comprise a first component based upon a sampling rate of a pulse response for a channel operating at a predetermined data rate in the multi-level signaling system utilizing the transition-limiting code, and a second component based upon a degree of reduction or elimination of full-swing transitions between signal levels in the multi-level signaling system utilizing the transition-limiting code.

In another particular exemplary embodiment of the present invention, the technique may be realized as at least one signal embodied in at least one carrier wave for transmitting a computer program of instructions configured to be readable by at least one processor for instructing the at least one processor to execute a computer process for performing the above-described method.

In still another particular exemplary embodiment of the present invention, the technique may be realized as at least one processor readable carrier for storing a computer program of instructions configured to be readable by at least one processor for instructing the at least one processor to execute a computer process for performing the above-described method.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 10 shows key code parameters/metric values for two channels at three line rates in accordance with the present invention.

DETAILED DESCRIPTION OF EXEMPLARY EMBODIMENT(S)

Transition-limiting codes have been developed which eliminate the number of full-swing transitions (FST) between sequential symbols in a multi-level signaling system. These transition-limiting codes have also been developed to provide useful clock data recovery (CDR) transitions. Other transition-limiting codes have been developed which reduce the number of full-swing transitions (FST) between sequential symbols in a multi-level signaling system. These other transition-limiting codes have also been developed to usually provide useful clock data recovery (CDR) transitions. The present invention provides a technique for determining which of the above-mentioned transition-limiting codes, or any number of other transition-limiting codes, is an optimal transition-limiting code for use in a multi-level signaling system.

Figure 1:
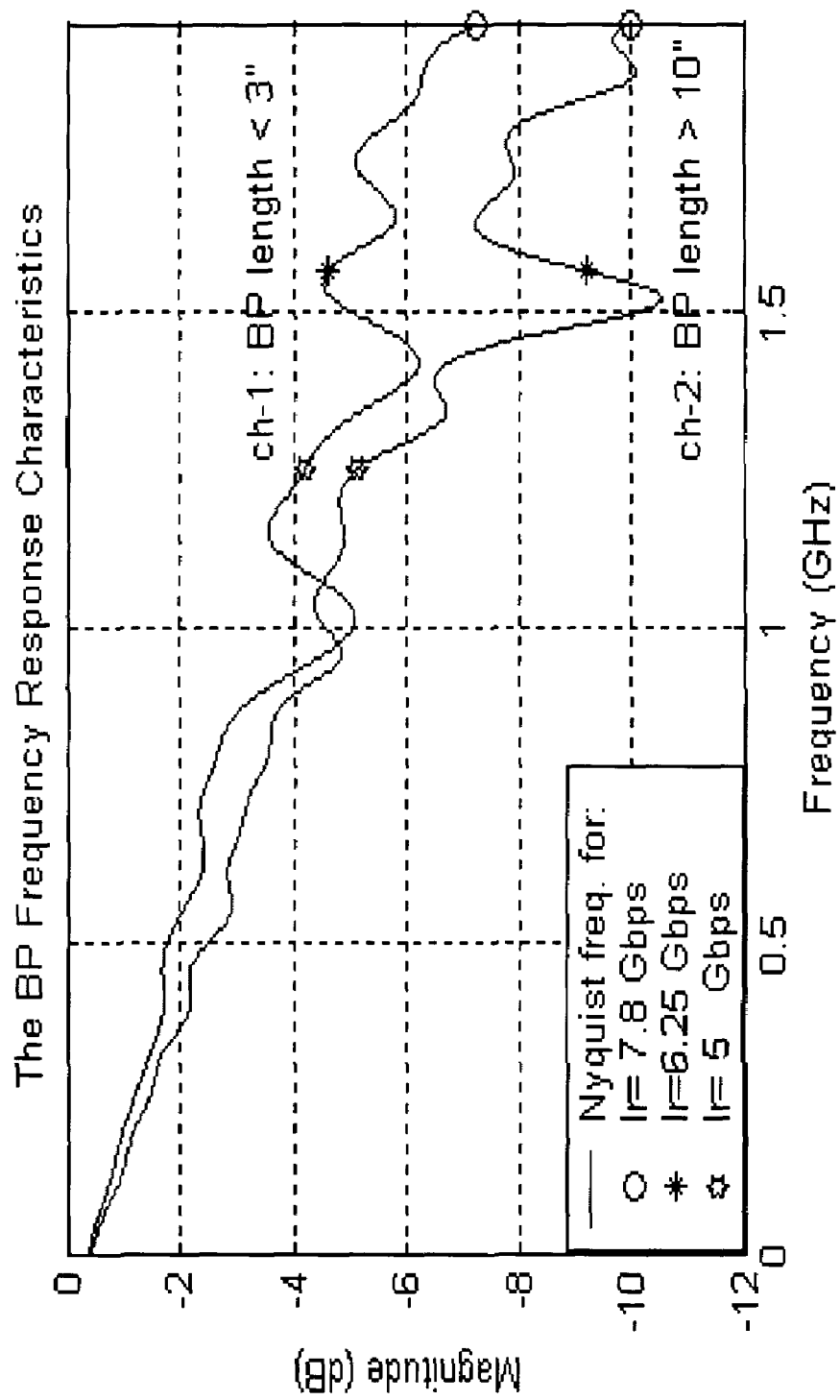
FIG. 1 is a graph showing a low loss-high reflections channel (i.e., ch-1) and a high loss-high reflections channel (i.e., ch-2) in a multi-level signaling system.

For purposes of understanding the present invention technique, it is first useful to realize the effectiveness of transition-limiting codes. Such effectiveness may be realized by comparing two channel types. For example, referring to FIG. 1, there is shown a first channel (i.e., ch-1), which is a low loss-high reflections channel, and a second channel (i.e., ch-2), which is a high loss-high reflections channel. In both cases, the loss characteristic is such that a 4-PAM line-coding is justified when compared to 2-PAM, while keeping the same data rate (i.e., the attenuation at a 2-PAM Nyquist frequency of 2x, is more than three times the attenuation at a 4-PAM Nyquist frequency of x).

Using the first channel (i.e., ch-1) and the second channel (i.e., ch-2) described above, high speed serial links at effective data rates of $er_1=5$ gigabits per second (Gbps) and $er_2=6.25$ Gbps may be simulated for cases of coded and uncoded transmissions utilizing 4-PAM signal levels (e.g., represented by +0.5V, +0.167V, −0.167V, and −0.5V signal levels). Characteristic impedance mismatches at near-end and far-end connectors may cause groups of reflections to travel different distances along a backplane. The topology of the backplane (and any linecards) and the signal propagation speed determine the positions of the reflections, which are sampling rate-dependent in symbol units. Since the attenuation of the reflections depends on their traveling distances, a highly attenuating channel would have a stronger impact on the group of reflections traveling the longest trips on the backplane, rendering the first group to be the largest contributor to postcursor ISI. Typically, the spread length of the reflections may range between 15-30 symbols. Equalized channels (e.g., channel one (ch-1) and channel two (ch-2)) may be characterized by an M symbol channel memory, which is line rate-dependent. Dispersion (1 precursor and first 3 postcursors of ISI) may be compensated by a 5-tap transmitter-side linear equalizer with peak transmit power constraint. The coding effects are then studied at a receiver input, on the residual, more distant, reflections-induced postcursor ISI.

The following analysis of the two channel types reveals the key parameters for determining code behavior and predicting expected bit error rate (BER) performance. In a peak distortion (PD) analysis, the focus is on worst case ISI. The probability of occurrence of a worst case uncoded sequence is proportional to $4^{-M}$. The probability of occurrence of a worst case coded sequence is proportional to $12^{-M/2}$. For the channel type and the performance of interest, these probabilities are comparable to the probability of symbol error. Therefore, PD analysis is also of practical interest in high speed serial links.

An average signal-to-noise ratio (SNR) analysis is also performed bounding the probability of detection error by considering a complete ISI probability distribution function (PDF) and a mean square distortion (MSD).

Let $\{d_i\}$ represent transmitted 4-PAM symbols, let $\Delta d = d_i - d_{i-1}$ represent the transition swing size, let $\{h_{i,u(c)}^{(j)}, j=1,2\}$ represent discrete time equivalent residual ISI uncoded (coded) channel ch-1 and channel ch-2, and let $\{y_k\}$ represent received ISI at time $t=kT$ (wherein T is the symbol period) such that:

$$y_k^{u(c)} = \sum_{i \neq k}^{t} d_i \cdot h_{k-i}^{u(c)} \quad (1)$$

Figure 2:
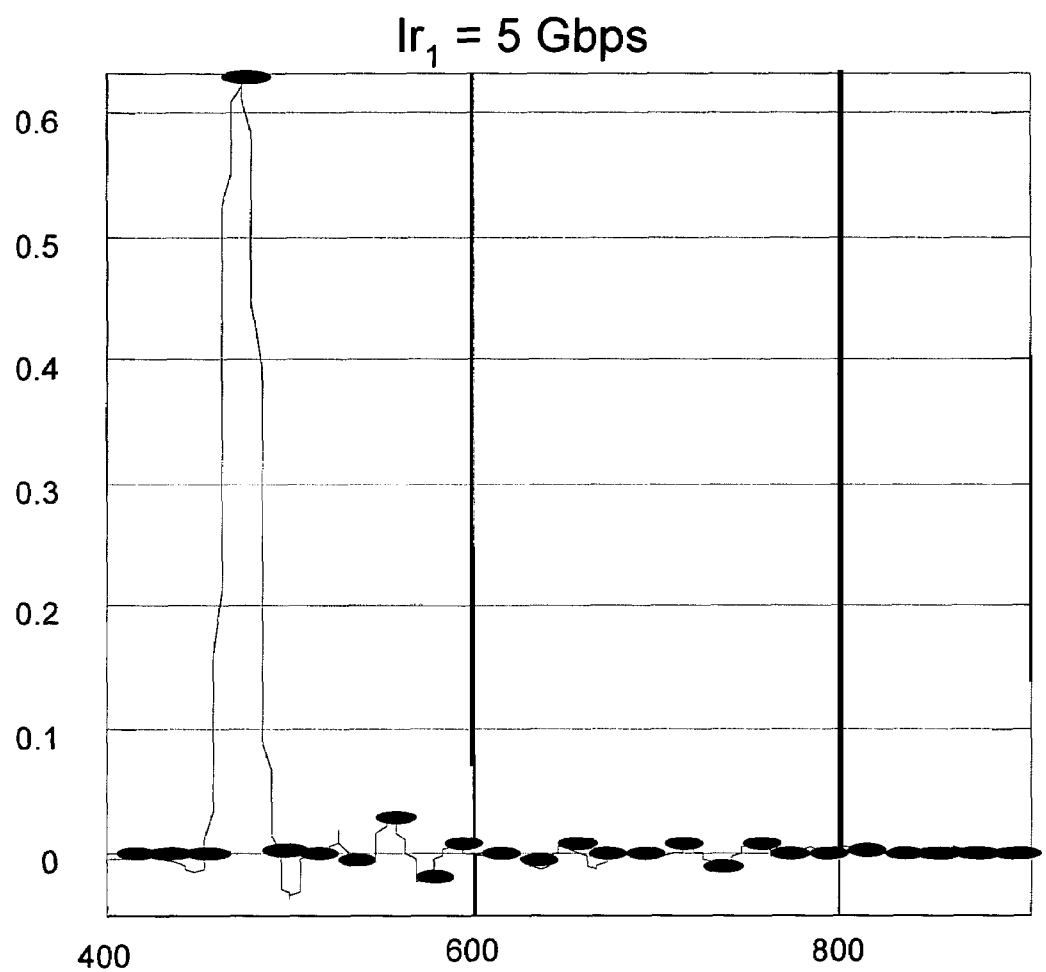
FIG. 2 is a graph showing an equalized pulse response from a 5-tap transmitter operating at a line rate ($lr_1$) of 5 Gbps on the second channel (i.e., ch-2).
Figure 3:
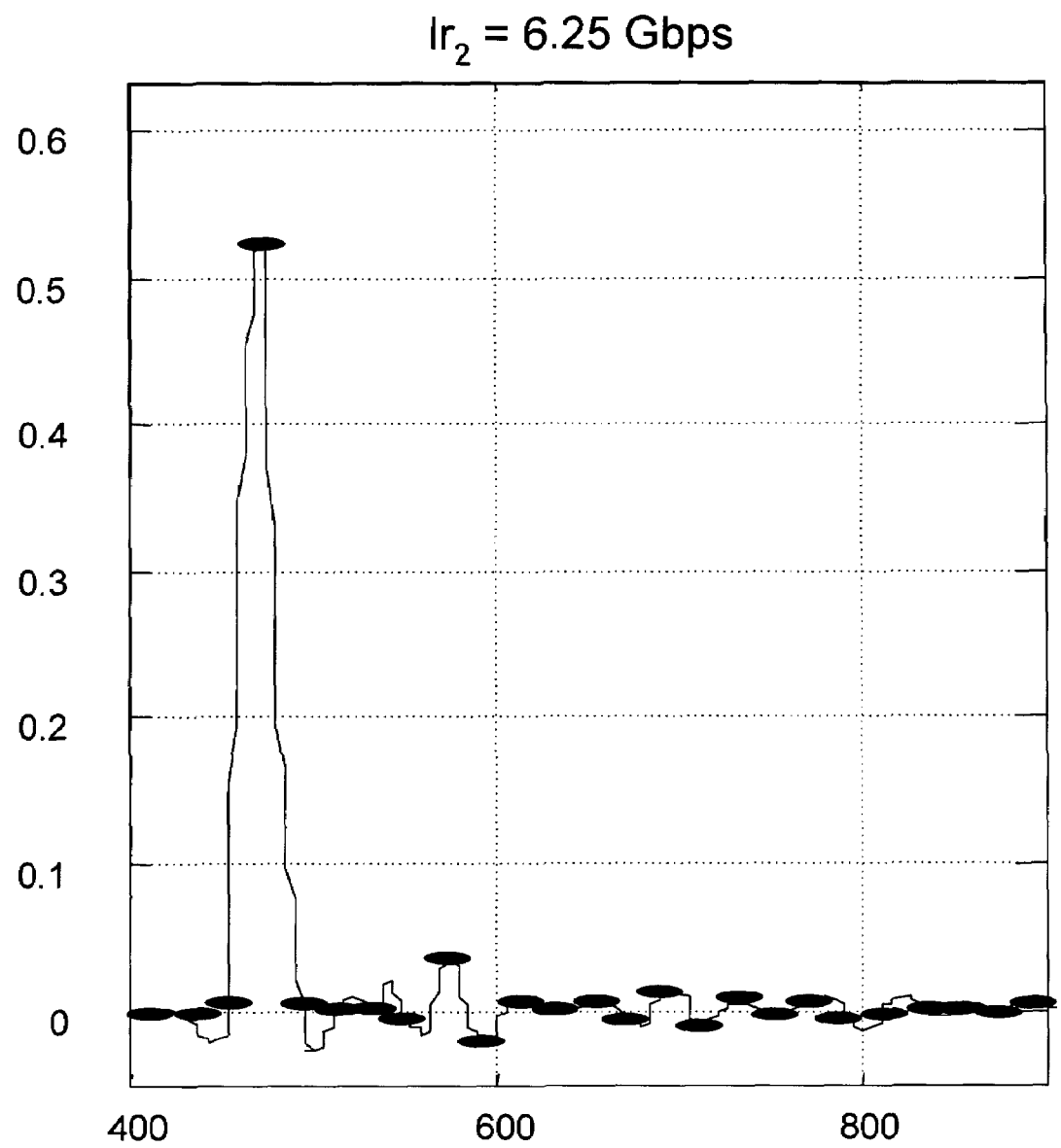
FIG. 3 is a graph showing an equalized pulse response from a 5-tap transmitter operating at a line rate ($lr_2$) of 6.25 Gbps on the second channel (i.e., ch-2).
Figure 4:
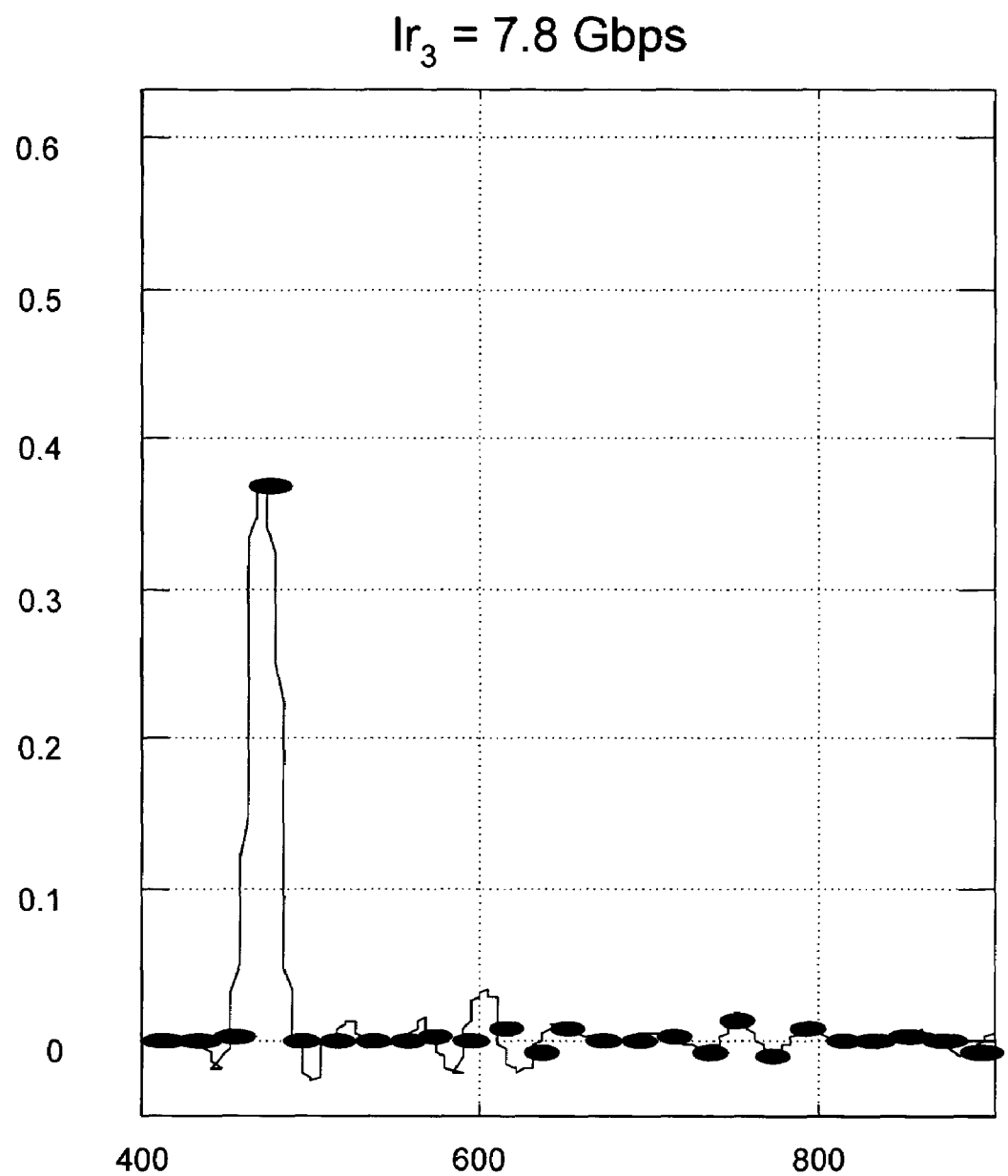
FIG. 4 is a graph showing an equalized pulse response from a 5-tap transmitter operating at a line rate ($lr_3$) of 7.8 Gbps on the second channel (i.e., ch-2).
Figure 5:
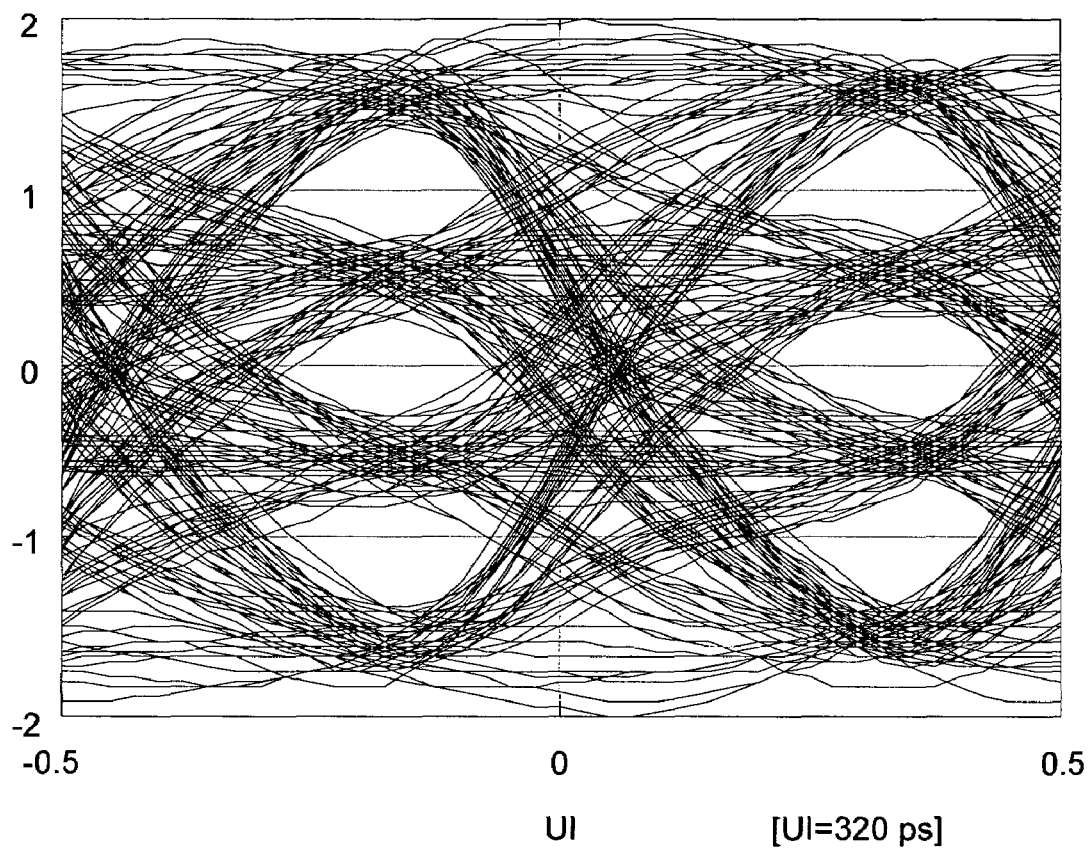
FIG. 5 shows a symbol eye diagram for an uncoded system.
Figure 6:
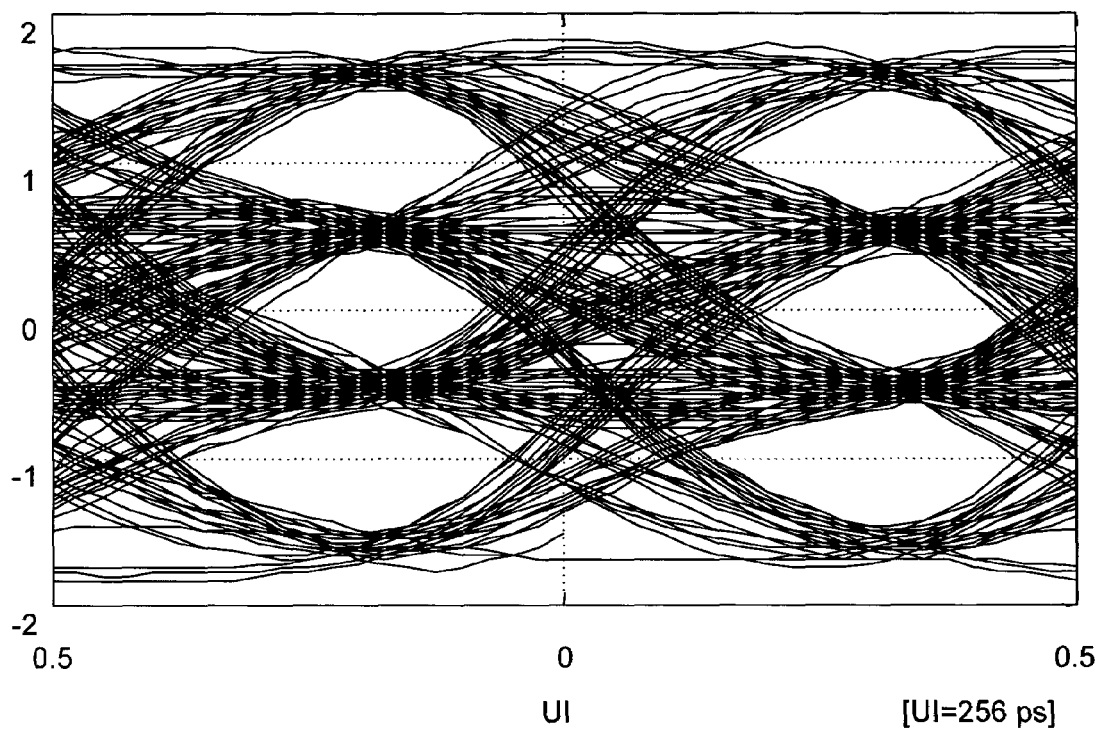
FIG. 6 shows a symbol eye diagram for a system utilizing a 4S5S transition-limiting code.
Figure 7:
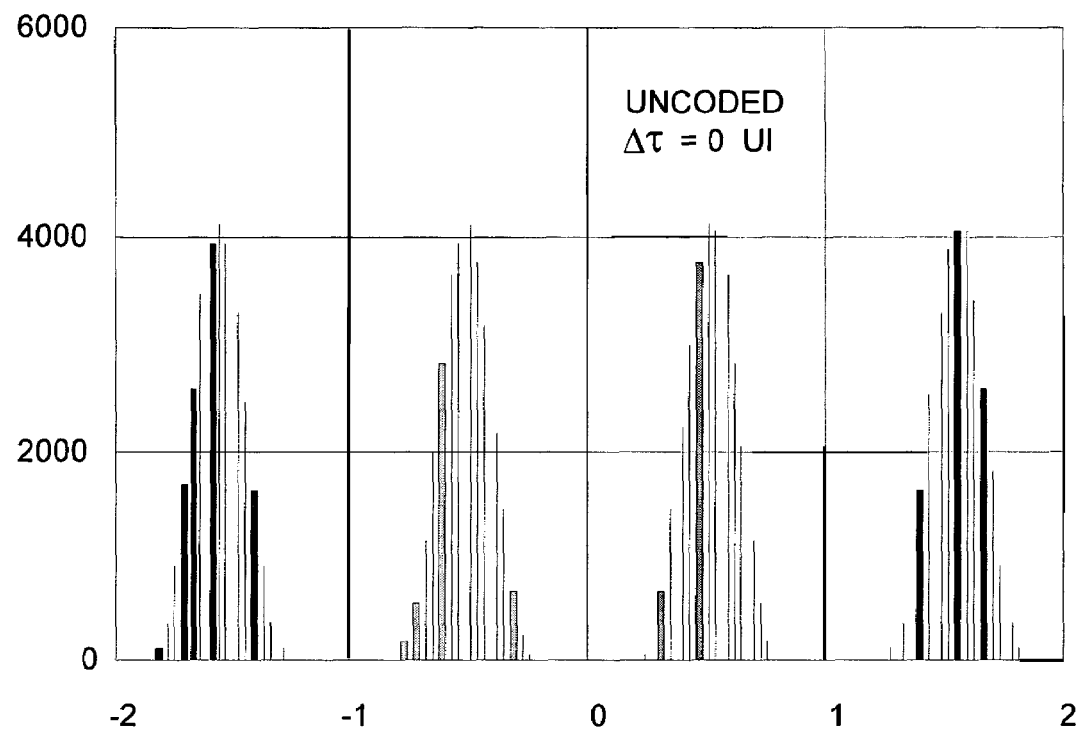
FIG. 7 shows ISI probability distribution functions per level for a center-sampled eye in an uncoded system.
Figure 8:
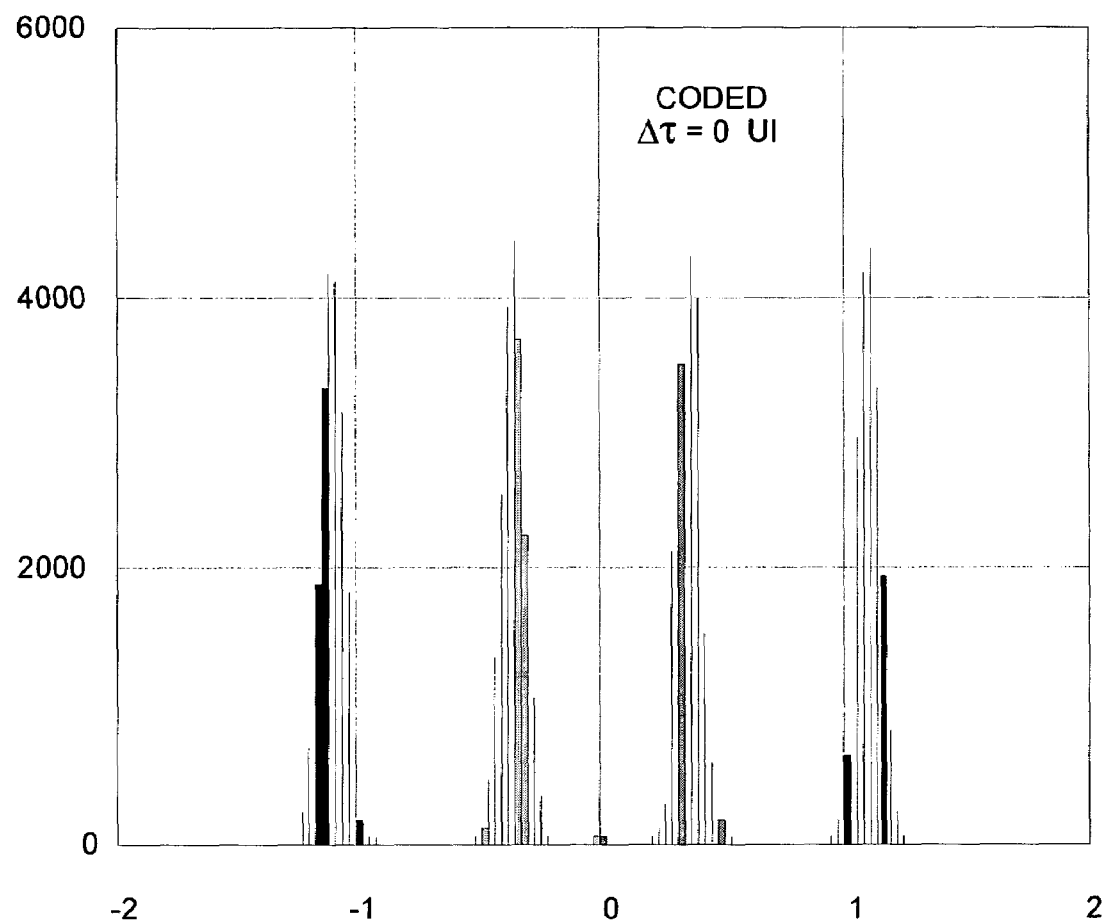
FIG. 8 shows ISI probability distribution functions per level for a center-sampled eye in a system utilizing a 4S5S transition-limiting code.

The use of transition-limiting codes has the direct and indirect effects of: 1.) reduction of maximum transition swing $\max|\Delta d_c|=2/3 \cdot \max|\Delta d_u|=4$; 2.) change of the line rate (lr), and therefore $h_i^c \neq h_i^u$; and 3.) further attenuation of the pulse response $h_0$, which also represents channel attenuation. For example, referring to FIG. 2, a graph is provided showing an equalized pulse response from a 5-tap transmitter operating at a line rate ($lr_1$) of 5 Gbps on the second channel (i.e., ch-2). Referring to FIG. 3, a graph is provided showing an equalized pulse response from a 5-tap transmitter operating at a line rate ($lr_2$) of 6.25 Gbps on the second channel (i.e., ch-2). Referring to FIG. 4, a graph is provided showing an equalized pulse response from a 5-tap transmitter operating at a line rate ($lr_3$) of 7.8 Gbps on the second channel (i.e., ch-2). Each of the above-mentioned graphs shows pulse responses subject to attenuation and residual ISI due to dispersion and reflections.

As demonstrated below, two components may be distinguished in a produced coding gain $\gamma$: 1.) a component $\gamma_{\Delta h}$ due to a faster sampled pulse response $h_i^c$; and 2.) a component $\gamma_{\Delta d}$ due to the reduction or elimination of full swing transitions, such that:

$\gamma = \gamma_{\Delta d} + \gamma_{\Delta h}$, where $\gamma_{\Delta d} < 20 \cdot \log_{10}(\max|\Delta d_u|/\max|\Delta d_c|) = 3.5$ dB  (2)

Also, based on sampled pulse responses $\{h_{i,u(c)}^{(j)}, j=1,2\}$ of coded and uncoded channels, rules and metrics may be derived for performance prediction, such as, for example, bounds for the probability of symbol error.

In the peak distortion (PD) analysis, bounds may make a distinction between those ISI terms which contribute to PD effects and those less-significant ISI terms which, after being convolved with a symbol sequence, are treated as additional Gaussian noise with a variance $\sigma_{u(c)}^2$. The distribution of $M=N+I$ postcursor ISI terms between I PD-contributing and N Gaussian noise-contributing is channel dependent and they may therefore be redistributed as the line rate changes with code overhead, such that:

$$h_i, \text{ with } \begin{cases} i \in I & \text{iff } |h_i| > \alpha \cdot |h_0| \\ o.w. & i \in N \end{cases}, \text{ where } \alpha \geq 0.01 \quad (3)$$

The PD criterion may be modified to generate upper/lower bounds for a transition-limiting coded channel, as demonstrated by:

$$PD_{u(c)}^{[t]} = h_0^{u(c)} \cdot \sum_{i \neq k}^{t} d_i^{u(c)} \cdot h_{k-i}^{u(c)}, \text{ where } t = M, I \quad (4)$$

For uncoded data, the $d_i^{*u}$ term, which represents a worst case uncoded sequence, may be defined by:

$d_i^{*u} = 3 \cdot \text{sign}(h_{k-i}^u)$  (5)

For transition-limiting coded data, a worst-case sequence producing a lower bound for the peak distortion may be defined by:

$$d_i^{*c} = \begin{cases} 2 \cdot \text{sign}(h_{k-i}^c), & \text{if } h_{k-i}^c \cdot h_{k-i-1}^c < 0 \text{ or } h_{k-i}^c \cdot h_{k-i+1}^c < 0 \\ 3 \cdot \text{sign}(h_{k-i}^c), & o.w. \end{cases} \quad (6)$$

A less accurate but simpler lower bound PD (i.e., $LPD_c$) for transition-limiting coded data may be formed by defining the $d_i^{*c}$ term as:

$d_i^{*c} = 2 \cdot \text{sign}(h_{k-i}^c)$  (7)

Both bounds get tighter as S/I→1, where S represents the number of most significant ISI values with alternating sign, such that:

$$S = \sum_i s_i, \text{ where } s_i = \begin{cases} 1, & \text{if } h_i \cdot h_{i-1} < 0 \ \& \ (i \text{ or } i-1 \in I) \\ 0, & \text{otherwise} \end{cases} \quad (8)$$

An upper bound PD (i.e., $UPD_c$) may be derived using a worst case sequence $\{d_i^c\}$ which produces $$\max_{d_i^c} PD_{u(c)}^{[t]},$$

which does not violate a transition-limiting code property of $|\Delta d_i^c| \leq 4$.

The probability of a symbol error at a detector (i.e., symbol error rate (SER)) versus an additive noise variance $\sigma_n^2$ for a worst case sequence is upper bounded by:

$$P_{u(c)}(e|d_i^{*u(c)}) \leq 1.5 \cdot Q((h_0 \cdot d_{min}/2 - PD_{u(c)}^{(I)})/\sqrt{\sigma_n^2 + 5 \cdot \sigma_{u(c)}^2}) \quad (9)$$

where $$\sigma_{u(c)}^2 = h_{0,u(c)}^2 \cdot \sum_{i \neq 0}^{t} h_{i,u(c)}^2, \text{ where } t = N \quad (10)$$

Finally, an ensemble distortion (ED) may be alternatively considered for worst case sequences of length 1 up to length I, with their corresponding probabilities of occurrence, to derive an upper bound ED (see FIG. 12) of:

$$ED_{u(c)} = P_{u(c)}(e/d_i^{*u(c)}) \approx \quad (11)$$

$$\sum_{j=0}^{I-1} \binom{I}{I-j} 4^{j-I} Q\left((h_0 \cdot d_{min}/2 - PD_{u(c)}^{(I-j)})/\sqrt{\sigma_n^2 + 5 \cdot \sigma_{u(c)}^2}\right)$$

In the average SNR analysis, MSD takes into account average degradation effects rather than considering a single worst case sequence only. To form an M-term $MSD^{[M]}$, and an I-term $MSD^{[I]}$, apply t=M, I in equation (10). This is used to approximate the probability of symbol error by applying the following in equation (9):

$$P_{u(c)}(e), \text{ where } PD_{u(c)}^{(I)} = 0, \sigma_{u(c)}^2|_{t=M,I} \quad (12)$$

Figure 9:
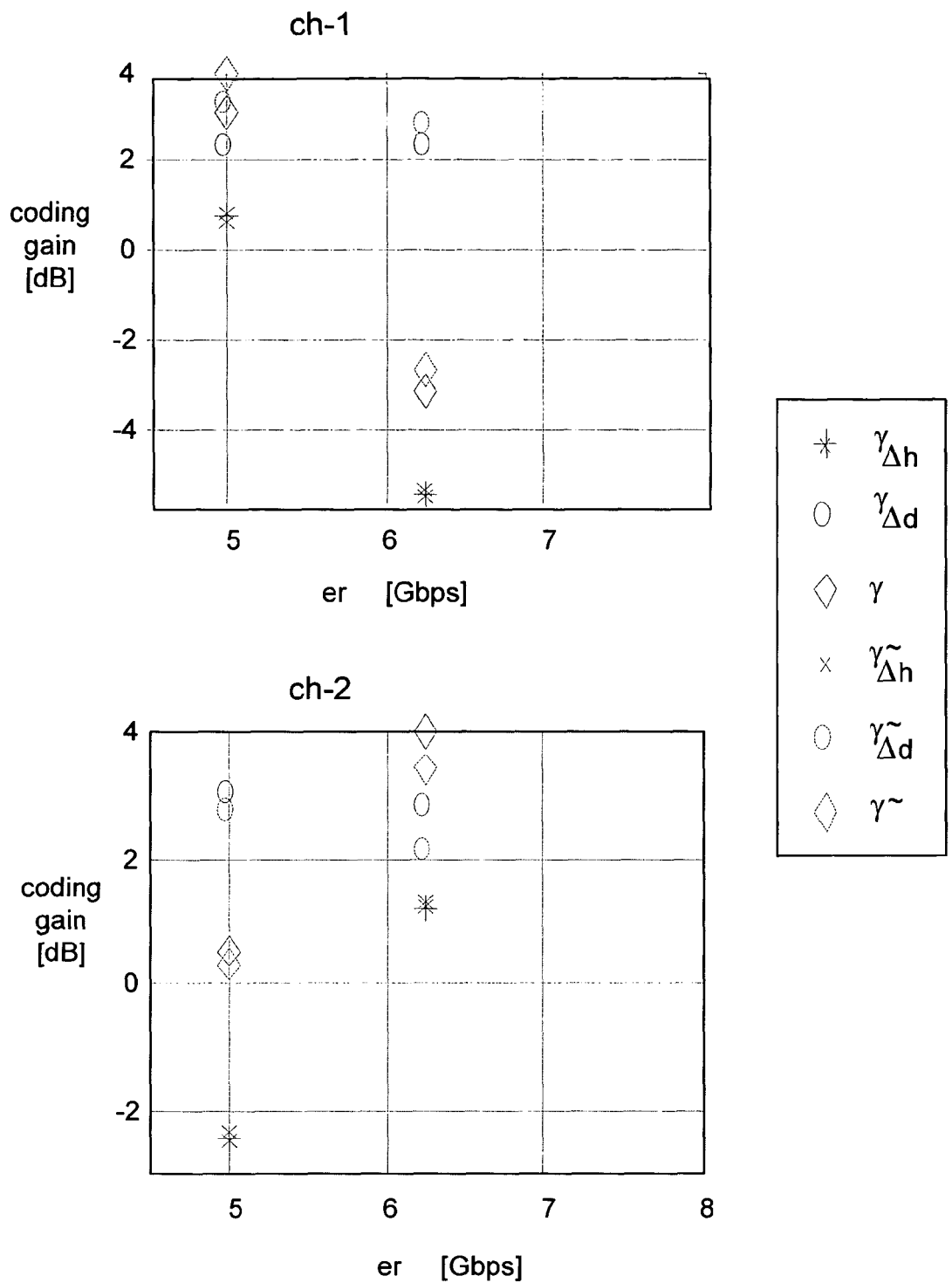
FIG. 9 shows simulated and analytical coding gains for two channels at two effective data rates in accordance with the present invention.

The average signal-to-ISI ratio (SIR) is determined by eye height (i.e., voltage margin) and ISI variance such that:

$$SIR = 1/3 \cdot \sum_{i=2}^{4} 20 \cdot \log_{10}\left((m_i - m_{i-1})/\sqrt{\sigma_i^2 + \sigma_{i-1}^2}\right) \quad (13)$$

wherein $m_i = E\{y_k | y_k \in R_i\}$ wherein $\sigma_i^2 = E\{y_k^2 | y_k \in R_i\} - m_i^2, i = 1, \ldots, 4$ wherein $R = \begin{bmatrix} \frac{y_k < -\varsigma}{R_1} & \frac{-\varsigma \leq y_k < 0}{R_2} & \frac{0 \leq y_k < \varsigma}{R_3} & \frac{y_k \geq \varsigma}{R_4} \end{bmatrix}$ wherein $\varsigma = (m_3 + m_4)/2$ wherein R represents a vector with decision regions, and ζ represents an upper eye threshold. Typically, a coded system produces smaller voltage margins due to a higher line rate (lr) and a low-pass characteristic of the channel. Therefore, its performance advantage over an uncoded system is based mainly on a significant reduction of the ISI variance $\sigma_i^2$. A "variance thinning" transformation of a coded ISI probability distribution function may be obtained via a reduction of the PD as well as of a larger group of highly distorting cases (see FIGS. 5-8). FIG. 9 shows produced coding gain γ for the two channels (i.e., ch-1 and ch-2) at the two data rates (i.e., $er_1$ and $er_2$) such that:

$$\gamma^{[erk]} = SIR_c^{[lrk+i]} - SIR_u^{[lrk]}, \gamma_{\Delta h}^{[erk]} = SIR_u^{[lrk+i]} - SIR_u^{[lrk]},$$
$$\gamma_{\Delta d}^{[erk9]} = SIR_c^{8\ [lrk+i]} - SIR_u^{[lrk+i]} \quad (14)$$

Note that $\gamma_{\Delta d}$ increases (decreases) as degradation due to resampled pulse response $h_i^c$ is increasing (decreasing), wherein:

$$\Delta \gamma_{\Delta d} \cdot \Delta \gamma_{\Delta h} < 0, \text{ where } \Delta \gamma_{\Delta d(\Delta h)} = \gamma_{\Delta d(\Delta h)}^{[er2]} - \gamma_{\Delta d(\Delta h)}^{[er1]} \quad (15)$$

Analytical metrics may be developed to provide estimates of the coding gain $\tilde{\gamma}$ and its components $\tilde{\gamma}_{\Delta h}, \tilde{\gamma}_{\Delta d}$. For example, let the ratio of X after and before coding be defined as follows:

$$\rho_y(X) = \log_y(X_c/X_u) \quad (16)$$

Also, let $\zeta = h_0^4/MSD^{[t]}$ and $\xi = h_0^2/PD^{[t]}$, wherein $PD^{[t]}$ is obtained using equations (4), (5), and (7), and then apply equation (16) to obtain:

$$\rho_{10}(\zeta^{[erk,j]}), \rho_{20}(\xi^{[erk,j]}) \begin{matrix} (j,k) = \begin{bmatrix} 11 \\ 22 \end{bmatrix} \to GAIN \\ > \\ < \\ (j,k) = \begin{bmatrix} 12 \\ 21 \end{bmatrix} \to LOSS \end{matrix} 0, \text{ and } t = I, M \quad (17)$$

wherein j corresponds to the channel, and $er_k$ corresponds to the effective data rate. Since $\rho_{10}(\zeta)$ depends only on the pulse response $\{h_i^{u(c)}\}$, while $\rho_{20}(\xi)$ depends on both the pulse response $\{h_i^{u(c)}\}$ and the data sequence $\{d_i^c\}$, the following approximations may be made for estimates of the coding gain components:

$$\tilde{\gamma}_{\Delta h} \propto \rho_{10}(\zeta), \quad \tilde{\gamma} \propto \rho_{20}(\xi) \stackrel{(2)}{\Rightarrow} \tilde{\gamma}_{\Delta d} \propto \rho_{20}(\xi) - \rho_{10}(\zeta) \quad (18)$$

For non-alternating consecutive pulse responses $\{h_i^c\}$, the code transition limiting constraint has a counter effect in minimizing average distortion. Therefore, $\gamma_{\Delta d}$ has a directly proportional relationship with S/I, and it is maximized for both channels (see FIG. 10). For channel one (ch-1), the most significant peaks/valleys of the reflections are more center-sampled at $lr_{1,3}$ producing smaller $\rho_{10}(\zeta)$, and more off-sampled at $lr_2$ increasing $\rho_{10}(\zeta)$. Therefore, channel one (ch-1), when utilizing a transition-limiting code, is more efficiently operated at $er_1$ than at $er_2$. The reverse conditions hold for channel two (ch-2) (see FIGS. 2-4), and therefore $er_2$ is the largest γ operating point.

Figure 11:
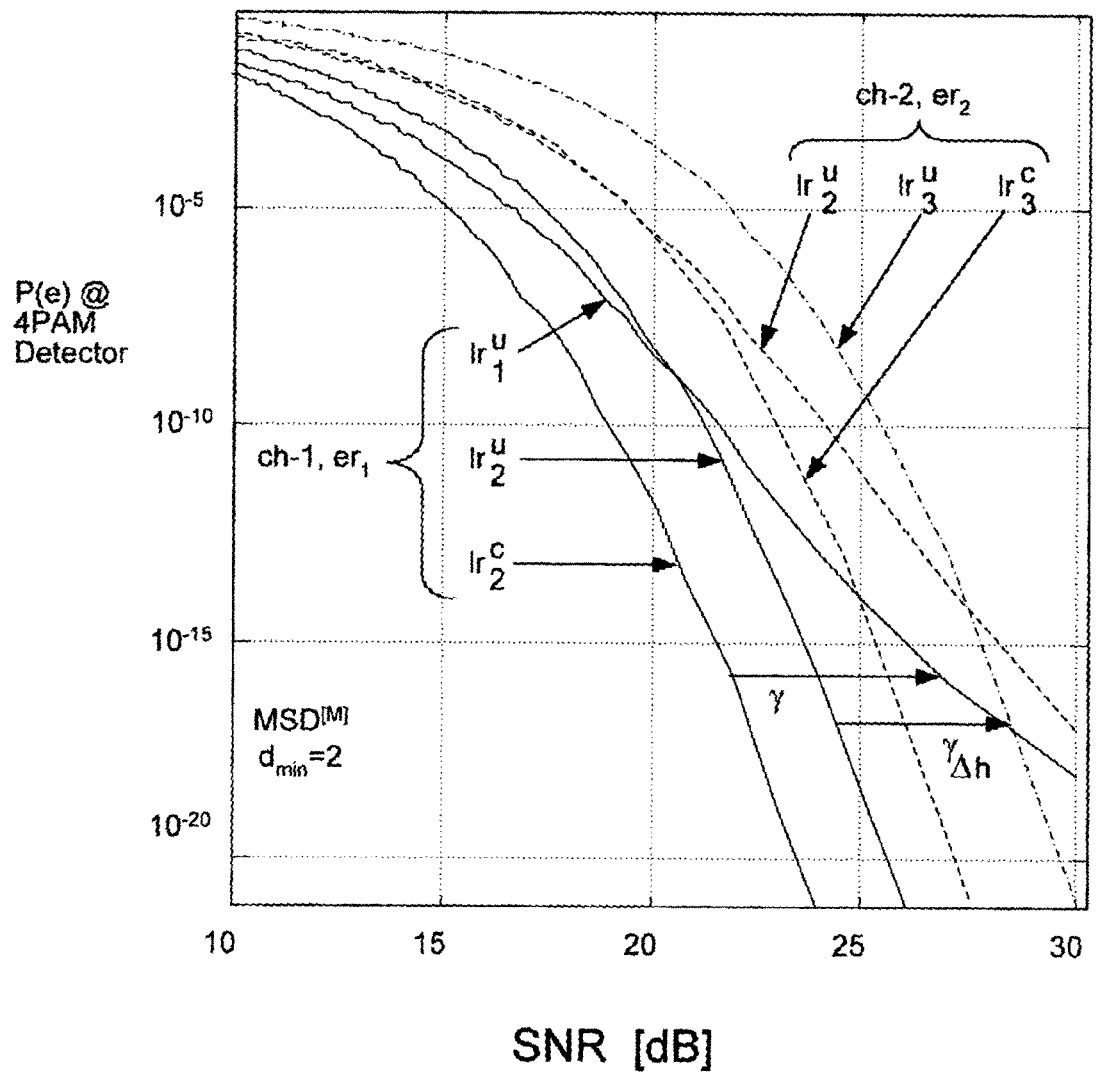
FIG. 11 compares coded and uncoded symbol error rate performance bounds in terms of mean square distortion for two channels at two effective data rates and at three line rates in accordance with the present invention.
Figure 12:
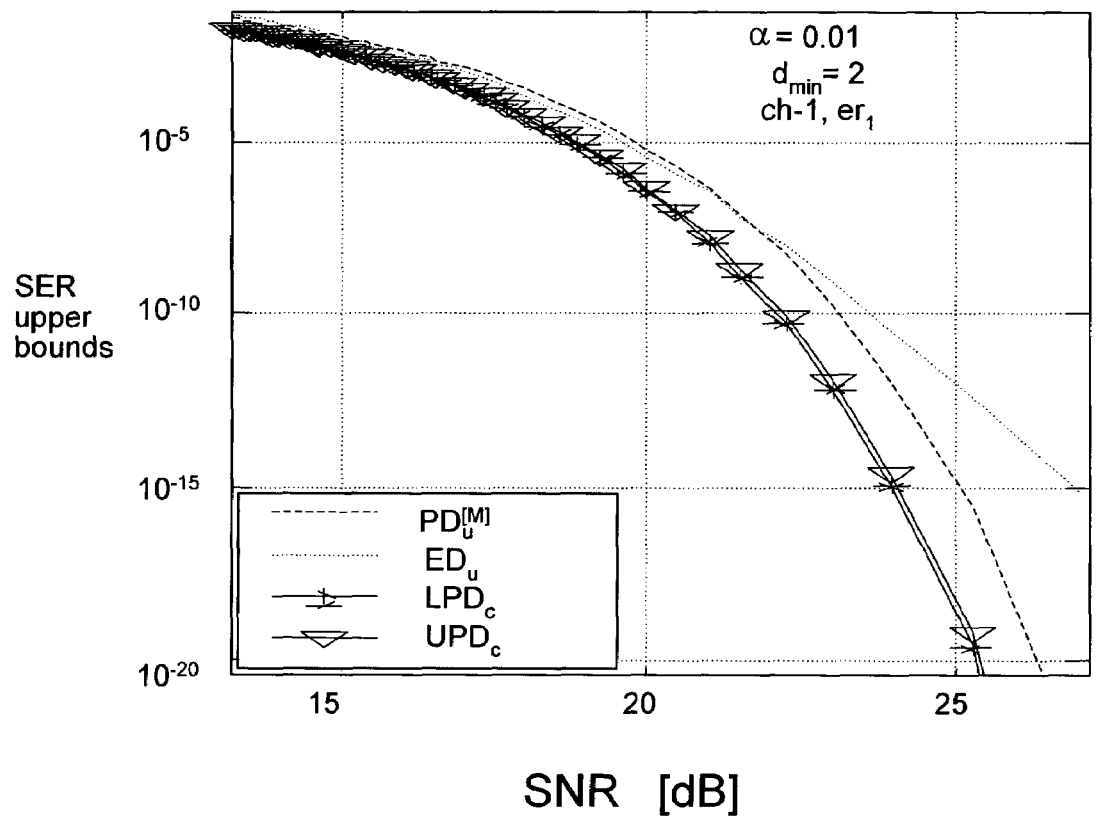
FIG. 12 compares coded and uncoded symbol error rate performance bounds in terms of peak distortion for one channel at one effective data rate in accordance with the present invention.

Referring to FIGS. 11 and 12, uncoded and coded SER performance bounds are compared. Without $\gamma_{\Delta d}$, the uncoded outperforms coded for low SNR since $\sigma_n^2$ dominates the denominator in equation (9) and the numerator is determined by channel attenuation, $h_0$, which is also higher when coded. The crossover point of the two curves is at 20 and 27 dB for (j,k)=(1,1), (2,2), respectively, where the gain component $\gamma_{\Delta h}$ becomes positive and increases thereafter with increasing SNR, since $MSD^{[r]}$ (the denominator term in equation (12)) dominates over the noise variance $\sigma_n^2$ and the attenuation $h_0$. To include $\gamma_{\Delta d}$, the coded-rate uncoded performance curves were left-shifted by 2.5 dB for higher SNR's (i.e., $\sigma_n^2 \ll \sigma_c^2$). Note also that the uncoded SER curve is limited by a residual ISI-induced performance floor after 27 dB of SNR, while the coded continues to improve. For example, for (j,k)=(1,1) to produce SER≈$10^{-15}$, an SNR=26.5 dB is required by the uncoded system, while only 21.1 dB is required by the coded system.

In summary, transition-limiting codes can increase the resilience of multi-level line codes to reflections. By reducing or eliminating full-swing transitions these transition-limiting codes can reduce peak and mean square distortion, and increase the timing margins. The present invention provides a technique for determining which transition-limiting code is an optimal transition-limiting code for use in a multi-level signaling system by taking into account the number and size of sampled reflections relative to channel pulse response attenuation, which reveals the channel types on which there exists coding gain and the noise margins and SER improvements over uncoded channels.

Figure 13:
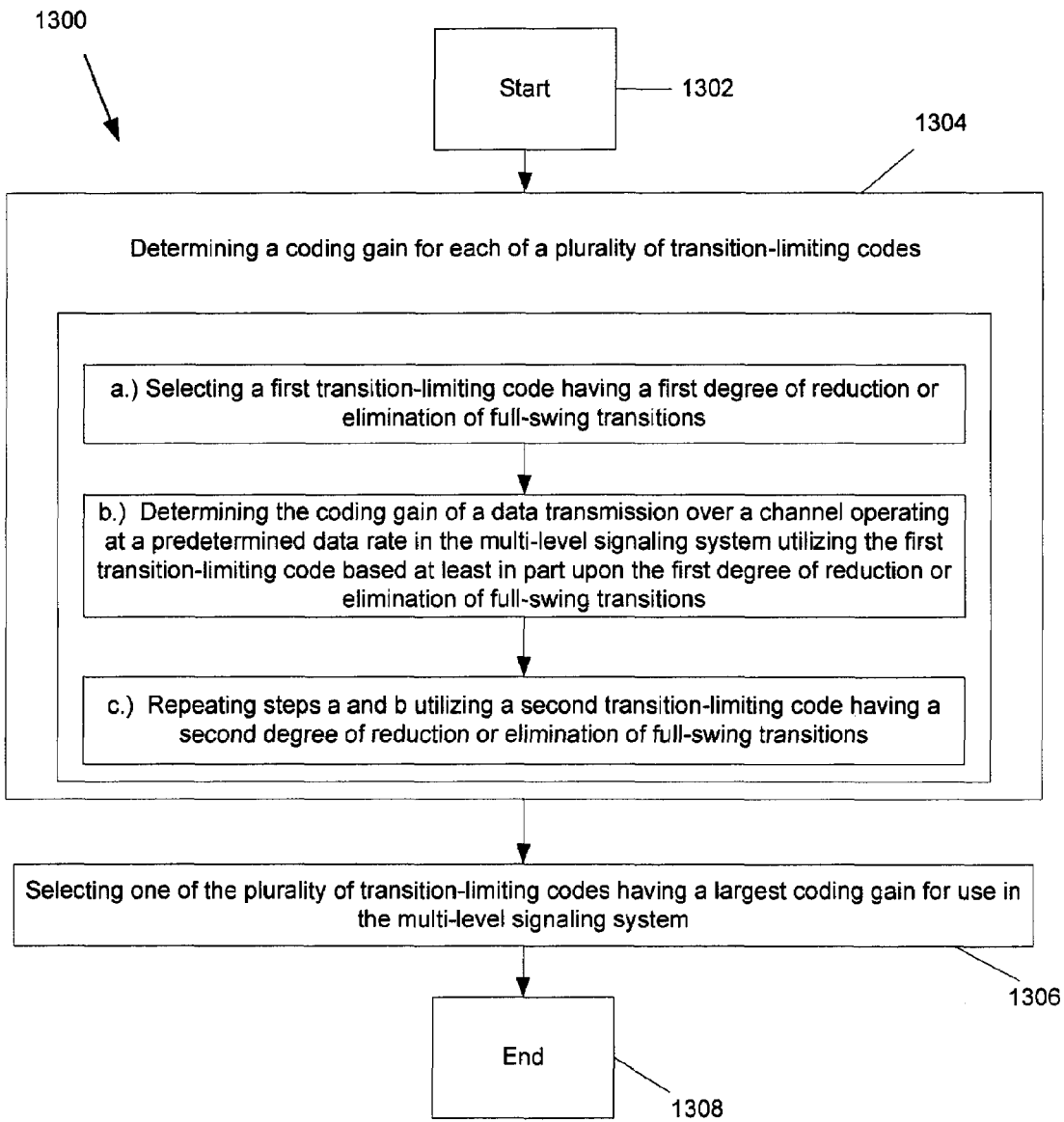
FIG. 13 shows a method for determining an optimal transition-limiting code for use in a multi-level signaling system in accordance with an embodiment of the present disclosure.

For example, referring to FIG. 13, there is shown a method 1300 for determining an optimal transition-limiting code for use in a multi-level signaling system in accordance with an embodiment of the present disclosure. The method 1300 may start at step 1302. At step 1304, the method 1300 comprises determining a coding gain for each of a plurality of transition-limiting codes. Step 1304 may comprise a.) selecting a first transition-limiting code having a first degree of reduction or elimination of full-swing transitions, b.) determining the coding gain of a data transmission over a channel operating at a predetermined data rate in the multi-level signaling system utilizing the first transition-limiting code based at least in part upon the first degree of reduction or elimination of full-swing transitions, and c.) repeating steps a and b utilizing a second transition-limiting code having a second degree of reduction or elimination of full-swing transitions. At step 1306, the method 1300 comprises selecting one of the plurality of transition-limiting codes having a largest coding gain for use in the multi-level signaling system. The method 1300 may end at step 1308.

Figure 14:
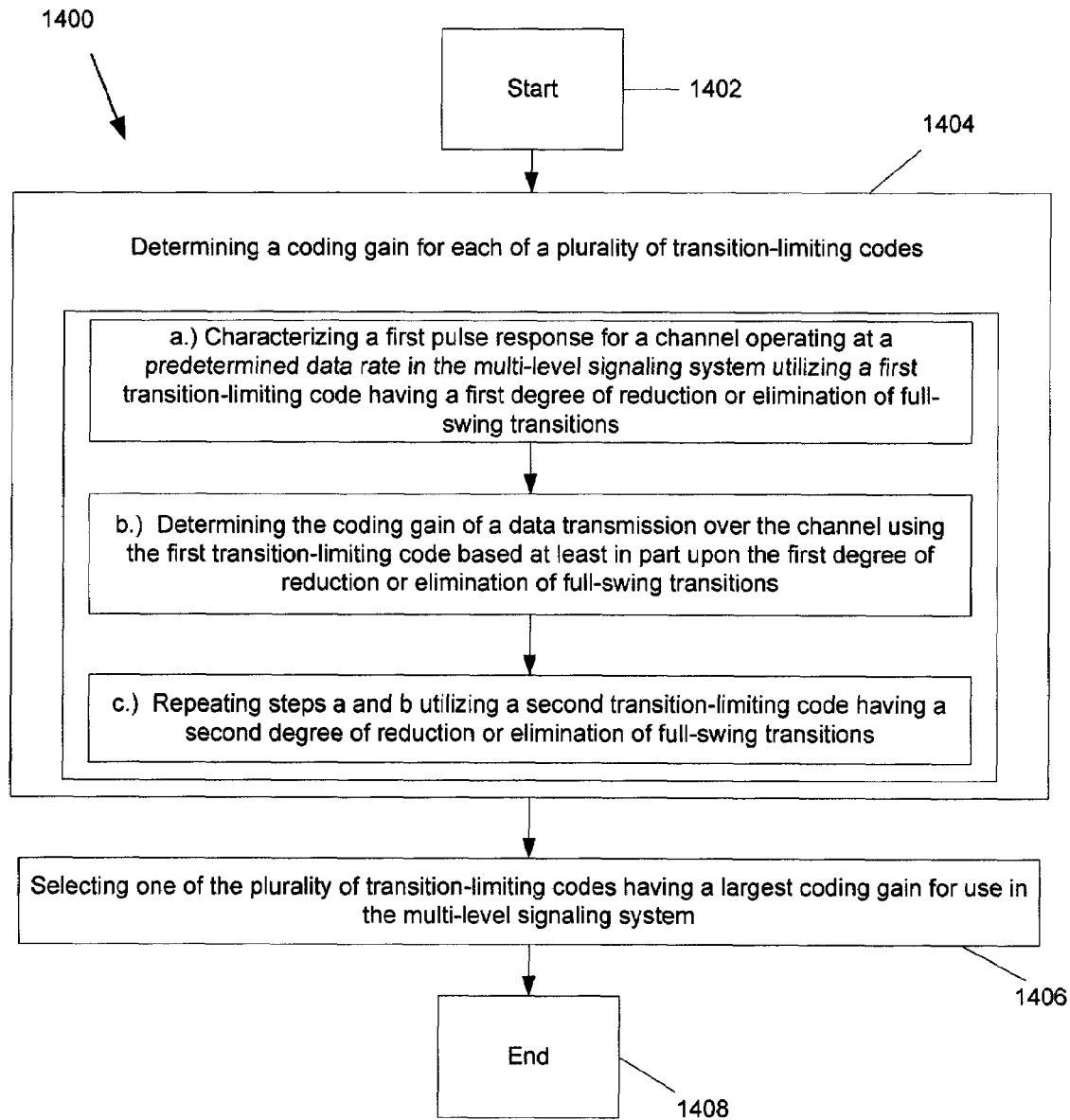
FIG. 14 shows a method for determining an optimal transition-limiting code for use in a multi-level signaling system in accordance with an alternative embodiment of the present disclosure.

Referring to FIG. 14, there is shown a method 1400 for determining an optimal transition-limiting code for use in a multi-level signaling system in accordance with an alternative embodiment of the present disclosure. The method 1400 may start at step 1402. At step 1404, the method 1400 comprises determining a coding gain for each of a plurality of transition-limiting codes. Step 1404 may comprise a.) characterizing a first pulse response for a channel operating at a predetermined data rate in the multi-level signaling system utilizing a first transition-limiting code having a first degree of reduction or elimination of full-swing transitions, b.) determining the coding gain of a data transmission over the channel using the first transition-limiting code based at least in part upon the first degree of reduction or elimination of full-swing transitions, and c.) repeating steps a and b utilizing a second transition-limiting code having a second degree of reduction or elimination of full-swing transitions. At step 1406, the method 1400 comprises selecting one of the plurality of transition-limiting codes having a largest coding gain for use in the multi-level signaling system. The method 1400 may end at step 1408.

Figure 15:
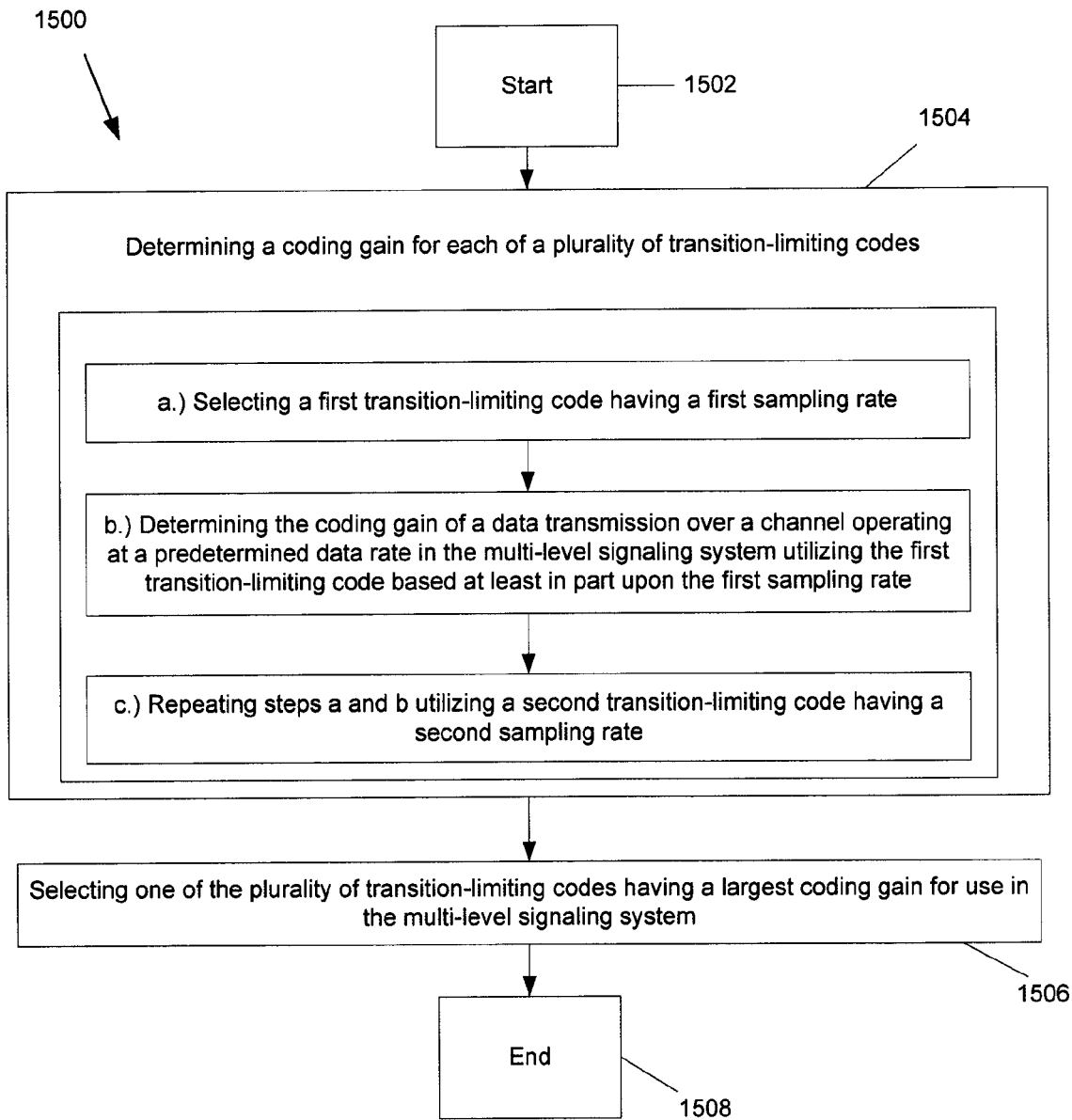
FIG. 15 shows a method for determining an optimal transition-limiting code for use in a multi-level signaling system in accordance with another alternative embodiment of the present disclosure.

Referring to FIG. 15, there is shown a method 1500 for determining an optimal transition-limiting code for use in a multi-level signaling system in accordance with another alternative embodiment of the present disclosure. The method 1500 may start at step 1502. At step 1504, the method 1500 comprises determining a coding gain for each of a plurality of transition-limiting codes. Step 1504 may comprise a.) selecting a first transition-limiting code having a first sampling rate, b.) determining the coding gain of a data transmission over a channel operating at a predetermined data rate in the multi-level signaling system utilizing the first transition-limiting code based at least in part upon the first sampling rate, and c.) repeating steps a and b utilizing a second transition-limiting code having a second sampling rate. At step 1506, the method 1500 comprises selecting one of the plurality of transition-limiting codes having a largest coding gain for use in the multi-level signaling system. The method 1500 may end at step 1508.

Figure 16:
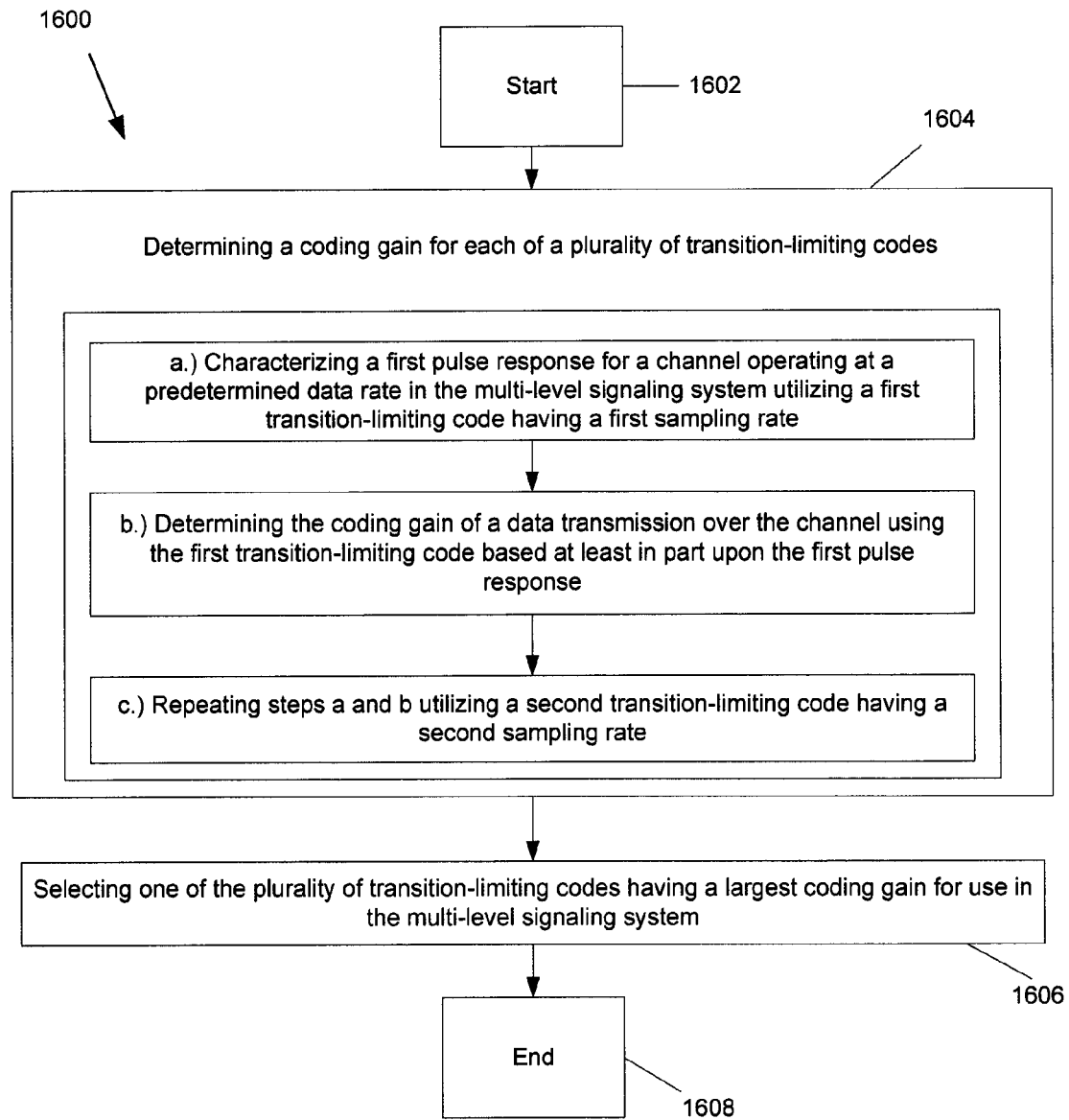
FIG. 16 shows a method for determining an optimal transition-limiting code for use in a multi-level signaling system in accordance with another alternative embodiment of the present disclosure.

Referring to FIG. 16, there is shown a method 1600 for determining an optimal transition-limiting code for use in a multi-level signaling system in accordance with another alternative embodiment of the present disclosure. The method 1600 may start at step 1602. At step 1604, the method 1600 comprises determining a coding gain for each of a plurality of transition-limiting codes. Step 1604 may comprise a.) characterizing a first pulse response for a channel operating at a predetermined data rate in the multi-level signaling system utilizing a first transition-limiting code having a first sampling rate, b.) determining the coding gain of a data transmission over the channel using the first transition-limiting code based at least in part upon the first pulse response, and c.) repeating steps a and b utilizing a second transition-limiting code having a second sampling rate. At step 1606, the method 1600 comprises selecting one of the plurality of transition-limiting codes having a largest coding gain for use in the multi-level signaling system. The method 1600 may end at step 1608.

At this point it should be noted that determining an optimal transition-limiting code for use in a multi-level signaling system in accordance with the present invention as described above may involve the processing of input data and the generation of output data to some extent. This input data processing and output data generation may be implemented in hardware or software. For example, specific electronic components may be employed in a transmitter, receiver, or other similar or related circuitry for implementing the functions associated with determining an optimal transition-limiting code for use in a multi-level signaling system in accordance with the present invention as described above. Alternatively, one or more processors operating in accordance with stored instructions may implement the functions associated with determining an optimal transition-limiting code for use in a multi-level signaling system in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method for determining an optimal transition-limiting code for use in a multi-level signaling system, the method comprising the steps of:
   determining a coding gain for each of a plurality of transition-limiting codes in the multi-level signaling system, wherein the coding gain for each of the plurality of transition-limiting codes is based at least in part upon a sampling rate of a pulse response for a channel operating at a predetermined data rate in the multi-level signaling system utilizing the transition-limiting code;
   selecting one of the plurality of transition-limiting codes having a largest coding gain for use in the multi-level signaling system; and
   encoding signals in an encoder using the selected transition-limiting code to at least reduce a number of full-swing transitions between sequential symbols in the multi-level signaling system.

2. The method of claim 1, wherein the plurality of transition-limiting codes reduce or eliminate full-swing transitions between sequential symbols in the multi-level signaling system.

3. The method of claim 2, wherein at least some of the plurality of transition-limiting codes have different degrees of reduction or elimination of full-swing transitions between sequential symbols in the multi-level signaling system.

4. The method of claim 3, wherein the step of determining a coding gain for each of a plurality of transition-limiting codes comprises the steps of:
   a.) selecting a first transition-limiting code having a first degree of reduction or elimination of full-swing transitions;
   b.) determining the coding gain of a data transmission over a channel operating at a predetermined data rate in the multi-level signaling system utilizing the first transition-limiting code based at least in part upon the first degree of reduction or elimination of full-swing transitions; and
   c.) repeating steps a and b utilizing a second transition-limiting code having a second degree of reduction or elimination of full-swing transitions.

5. The method of claim 3, wherein the step of determining a coding gain for each of a plurality of transition-limiting codes comprises the steps of:
   a.) characterizing a first pulse response for a channel operating at a predetermined data rate in the multi-level signaling system utilizing a first transition-limiting code having a first degree of reduction or elimination of full-swing transitions;
   b.) determining the coding gain of a data transmission over the channel using the first transition-limiting code based at least in part upon the first degree of reduction or elimination of full-swing transitions; and
   c.) repeating steps a and b utilizing a second transition-limiting code having a second degree of reduction or elimination of full-swing transitions.

6. The method of claim 1, wherein at least some of the plurality of transition-limiting codes have different sampling rates.

7. The method of claim 6, wherein the step of determining a coding gain for each of a plurality of transition-limiting codes comprises the steps of:
   a.) selecting a first transition-limiting code having a first sampling rate;
   b.) determining the coding gain of a data transmission over a channel operating at a predetermined data rate in the multi-level signaling system utilizing the first transition-limiting code based at least in part upon the first sampling rate; and
   c.) repeating steps a and b utilizing a second transition-limiting code having a second sampling rate.

8. The method of claim 6, wherein the step of determining a coding gain for each of a plurality of transition-limiting codes comprises the steps of:
   a.) characterizing a first pulse response for a channel operating at a predetermined data rate in the multi-level signaling system utilizing a first transition-limiting code having a first sampling rate;
   b.) determining the coding gain of a data transmission over the channel using the first transition-limiting code based at least in part upon the first pulse response; and
   c.) repeating steps a and b utilizing a second transition-limiting code having a second sampling rate.

9. The method of claim 1, wherein the coding gain for each of the plurality of transition-limiting codes is further based at least in part upon a degree of reduction or elimination of full-swing transitions between symbols in the multi-level signaling system utilizing the transition-limiting code.

10. At least one processor readable storage medium storing a computer program of instructions configured to be readable by at least one processor for instructing the at least one processor to execute a computer process for performing the method as recited in claim 1.

11. An article of manufacture for determining an optimal transition-limiting code for use in a multi-level signaling system, the article of manufacture comprising:
   at least one processor readable storage medium; and
   instructions stored on the at least one medium;
   wherein the instructions are configured to be readable from the at least one medium by at least one processor and thereby cause the at least one processor to operate so as to:
   determine a coding gain for each of a plurality of transition-limiting codes in the multi-level signaling system, wherein the coding gain for each of the plurality of transition-limiting codes is based at least in part upon a sampling rate of a pulse response for a channel operating at a predetermined data rate in the multi-level signaling system utilizing the transition-limiting code;
   select one of the plurality of transition-limiting codes having a largest coding gain for use in the multi-level signaling system; and
   encode signals using the selected transition-limiting code to at least reduce a number of full-swing transitions between sequential symbols in the multi-level signaling system.

* * * * *

UNITED STATES PATENT AND TRADEMARK OFFICE
CERTIFICATE OF CORRECTION

PATENT NO. : 7,620,116 B2 Page 1 of 1
APPLICATION NO. : 10/667492
DATED : November 17, 2009
INVENTOR(S) : Bessios et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1644 days.

Signed and Sealed this

Twenty-sixth Day of October, 2010

David J. Kappos
*Director of the United States Patent and Trademark Office*